(12) United States Patent
Walton et al.

(10) Patent No.: US 8,052,872 B2
(45) Date of Patent: Nov. 8, 2011

(54) METHODS AND DEVICE FOR ENHANCEMENT OF ANAEROBIC DIGESTION

(75) Inventors: John R. Walton, Colfax, CA (US); Michael Fagan, Blairstown, NJ (US); Ian M. Watson, Carlsbad, CA (US); Chester L. Szczucki, Bristol, PA (US)

(73) Assignee: U.S. Peroxide LLC, Atlanta, GA (US)

( * ) Notice: Subject to any disclaimer, the term of this patent is extended or adjusted under 35 U.S.C. 154(b) by 282 days.

(21) Appl. No.: 12/370,878

(22) Filed: Feb. 13, 2009

(65) Prior Publication Data

US 2009/0200231 A1 Aug. 13, 2009

Related U.S. Application Data

(60) Provisional application No. 61/028,264, filed on Feb. 13, 2008.

(51) Int. Cl.
*C02F 3/30* (2006.01)

(52) U.S. Cl. .......... 210/605; 210/609; 210/631

(58) Field of Classification Search .......... 210/603, 210/605, 609, 631
See application file for complete search history.

(56) References Cited

U.S. PATENT DOCUMENTS

| | | | |
|---|---|---|---|
| 4,913,826 A | 4/1990 | Mannig et al. | |
| 5,514,578 A | 5/1996 | Hogness et al. | |
| 5,599,451 A | 2/1997 | Guiot | |
| 5,914,441 A * | 6/1999 | Hunter et al. | 75/712 |
| 6,096,227 A | 8/2000 | Conaway | |
| 6,398,968 B1 * | 6/2002 | Higby | 210/721 |
| 6,569,332 B2 | 5/2003 | Ainsworth et al. | |
| 6,773,604 B2 | 8/2004 | Walton et al. | |
| 6,863,826 B2 | 3/2005 | Sheets | |
| 7,101,482 B2 | 9/2006 | Chauzy et al. | |
| 7,147,783 B2 | 12/2006 | Walton et al. | |
| 7,220,360 B2 | 5/2007 | Chen et al. | |
| 2007/0187329 A1 | 8/2007 | Moller et al. | |

FOREIGN PATENT DOCUMENTS

JP 1-236999 A * 9/1989
JP 2003-200141 A * 7/2003

OTHER PUBLICATIONS

Bretler, G., et al., 'A medium optimization strategy for improvement of growth and methane production by *Methanobacterium thermoautotrophicum*', Journal of Biotechnology, vol. 50, Issue 2-3, Oct. 1, 1996, pp. 201-212.

Cacho Rivero, J.A., et al., 'Oxidative co-treatment using hydrogen peroxide with anaerobic digestion of excess municipal sludge', Water Environment Research, vol. 78, No. 7 (Jul. 2006), pp. 691-700(10).

(Continued)

*Primary Examiner* — Fred Prince
(74) *Attorney, Agent, or Firm* — Woodcock Washburn LLP

(57) ABSTRACT

Methods of enhancing anaerobic digestion of wastewater are provided. The methods comprise pressure oxidation of digester material to remove sulfide and/or regenerate iron. Also provided are a pressure oxidizer device and a wastewater treatment system having one or more of such devices. The methods, device, and system have application in treatment of municipal wastewater, wastewater of agricultural and livestock operations, and in biofuels production.

16 Claims, 2 Drawing Sheets

Pressure Oxidizer Device 100

OTHER PUBLICATIONS

Carter, J.L., et al., 'Effects of iron activated sludge treatment', Journal of the Environmental Engineering Division, American Society of Civil Engineers, vol. 99, No. EE2 (Apr. 1973) pp. 135-152.

Chidthaisong, A., et al., 'Turnover and glucose and acetate coupled to reduction of nitrate, ferric iron and sulfate and to methanogenesis in anoxic rice field soil', FEMS Microbiology Ecology, vol. 31, Issue 1 (Jan. 2000), pp. 73-86.

Clark, P.B., et al., 'Enhancement of anaerobic digestion using duckweed (Lemna minor) enriched with iron', Journal of the Chartered Institution of Water and Environmental Management, vol. 10, No. 2, (1996), pp. 92-95.

Conrad, R., 'Contribution of hydrogen to methane production and control of hydrogen concentrations in methanogenic soils and sediments', FEMS Microbiology Ecology, vol. 28, Issue 3 (Mar. 1999), pp. 193-202.

Conrad, R., et al., 'Phosphate inhibits acetotrophic methanogenesis on rice roots', Applied and Environmental Microbiolody', vol. 66, No. 2 (Feb. 2000), pp. 828-831.

Das, D., et al., 'Role of Fe-hydrogenase in biological hydrogen production', Current Science, http://www.ias.ac.in/currsci/jun252006/1627.pdf. vol. 90, No. 12 (Jun. 2006), pp. 1627-1637.

Doyle, D., et al., 'Struvite formation, control and recovery', Water Research, 36(16), (2002), pp. 3925-3940.

Ellermann, J., et al., 'The final step in methane formation: Investigations with highly purified methyl-CoM reductase (component C) from Methanobacterium thermautotrophicum (strain Marburg)', Eur. J. Biochem., 172, (1988) pp. 669-677.

Fathepure, B.Z., 'Factors affecting the methanogenic activity of methanothrix soehngenii VNBF', Appl. Environ. Microbiol., 53(12) (Dec. 1987), pp. 2978-2982.

Francis, A.J., et al., 'Influence complexes structure on the biodegradation of iron-citrate complexes', Appl. Environ. microbiol. 59(1) (Jan. 1993), pp. 109-113.

Gonzales-Gil, G., et al., 'Effects of nickel and cobalt on kinetics of methanol conversion by methanogenic sludge as assessed by online CH4 monitoring', vol. 65, No. 4, (Apr. 1999), pp. 1789-1793.

Gyhoot, W., et al., 'Anaerobic digestion of primary sludge from chemical pre-precipitation', Water Science and Technolgy, vol. 36, Issue 6-7 (1997), pp. 357-365.

Haschke, R.H., et al., 'Purification and properties of a hydrogenase from Desulfovibrio vulgaris', J Bacteriol., 105(1), (Jan. 1971), pp. 249-258.

Hearn, P.P., et al., Authigenic vivianite in Potomac River sediments;control by ferric oxy-hydroxides, Journal of Sedimentary Research, vol. 53, No. 1, (Mar. 1983), pp. 165-177.

Jeganaesan, J., et al., 'Long-term performance for high-rate anaerobic reactors for the treatment of oily wastewater', Environ. Sci. Technol., vol. 40, No. 20 (2006), pp. 6466-6472.

Lee, Young Joon, et al., 'Effect of iron concentration on hydrogen fermentation', Bioresource Technology, vol. 80, Issue 3, Dec. 2001, pp. 227-231.

Levit, M.N., et al., 'Lignan and ligninase', Bioorg. Khim, 18(3), Mar. 1992, pp. 309-345. (Abstract).

Li, Z., et al., 'Anaerobic biodegradation of vegetable oil and its metabolic intermediates in oil-enriched freshwater sediments', Biodegradation, vol. 16, No. 4 (Aug. 2005), pp. 341-352.

Li, Z., et al., 'Effects of ferric hydroxide on methanogenesis from lipids and long-chain fatty acids in anaerobic digestion', Water Environment Research, vol. 78, No. 5 (May 2006), pp. 522-530(9).

Li, Z., et al., 'Effects of ferric hydroxide on the anaerobic biodegradation kinetics and toxicity of vegetable oil in freshwater sediments', Water Research, 38(18), (Nov. 2004), pp. 3859-3868.

Loewenthal, R.E., et al., 'Modelling struvite precipitation in anaerobic treatment systems', Water Science and Technology, vol. 30, No. 12, (1994), pp. 107-116.

Lovely, D.R., et al., 'Novel mode of microbial energy metabolism:Organic carbon oxidation coupled to dissimilatory reduction of iron or manganese', Applied. Environ. Microbiol., 54(6), (Jun. 1988), pp. 1472-1480.

Lovely, D.R., et al., 'Organic matter mineralization with reduction of ferric iron in anaerobic sediments', Appl. Environ. Microbiol., 51(4) (1986) pp. 683-689.

Lovely, D.R., 'Dissimilatory Fe(III) and Mn(IV) reduction', Microbiological Reviews, 55(2), Jun. 1991, pp. 259-287.

Mamais, D, et al., 'Determination of ferric chloride dose to control struvite precipitation in anaerobic sludge digester', Water Environment Research, vol. 66, No. 7, (1994) pp. 912-918.

McCammon, C.A., et al., 'The oxidation mechanism of vivianite as studied by Mossbauer spectroscopy', American Mineralogist, vol. 65, (1980), pp. 361-366.

Muller, et al., 'High-intensity shear as a wet sludge disintegration technology and a mechanism for floc structure analysis', (May 29, 2001), pp. 1-70.

Murthy, S.N., 'Bioflocculation: Implications for activated sludge properties and wastewater treatment', http://scholar.lib.vt.edu/theses/available/etd-63098-18036/ (Jul. 23, 1998), pp. 1-162.

Neyens, E., et al., 'Pilot-scale peroxidation (H2O2) of sewage sludge', J Hazard Mater., 98(1-3), (Mar. 17, 2003), pp. 91-106.

Nriagu, J., 'Stability of vivianite and ion-pair formation in the system Fe3(PO4)2-H3P04-H2O', Geochimica et Cosmochimica Acta, vol. 36, Issue 4, (Apr. 1972), pp. 459-470.

Ohlinger, K.N., et al., 'Predicting struvite formation in digestion', Water Research, vol. 32, Issue 12, Dec. 1998, pp. 3607-3614.

Ohmura, N., et al., 'Anaerobic respiration using Fe3+, So, and H2 in the chemolithoautotrophic bacterium Acidithiobacillus ferrooxidans', Journal of Bacteriology, vol. 184. No. 8 (Apr. 2002), pp. 2081-2087.

Park, C., 'Cations and activated sludge floc structure', (Jul. 23, 2002), 74 pages.

Park, D.H., et al., 'Improved fuel cell and electrode designs for producing electricity from microbial degradation', Wiley Periodicals, Inc., Biotechnol. Bioeng., 81, 2003, pp. 348-355.

Rees, D.C., 'The interface between the biological and inorganic worlds: Iron-sulfur metalloclusters', Science, vol. 300, No. 5621 (May 2003), pp. 929-931.

Speece, R.E., 'Survey of municipal anaerobic sludge digesters and diagnostic activity assays', Water Research WATRAG, vol. 22. No. 3, (Mar. 1988), pp. 365-372.

Stabnikov, V.P., et al., 'Effect of iron hydroxide on the phosphate elimination during anaerobic digestion of active sludge', Prikl Biokhim Mikrobiol., 40(4), (Jul.-Aug. 2004), pp. 442-447. (Abstract).

Stams, A.J.M., et al., 'Mini-review:Exocellular electron transfer in anaerobic microbial communities', Environmental Microbiology, vol. 8, Issue 3, (Mar. 2006), p. 371-382.

Tanaka, K., et al., 'Thionine and ferric chelate compounds as coupled mediators in microbial fuel cells', Bioelectrochemistry and Bioenergetics, vol. 11, No. 4-6, (1983), pp. 289-297.

Tartakovsky, B., et al., 'A comparison of air and hydrogen peroxide oxygenated microbial fuel cell reactors' Biotechnol. Prog., 22(1), 2006, pp. 241-246.

Van Bodegom, P.M., et al., 'Direct inhibition of methanogenesis by ferric iron', FEMS Microbiology Ecology, vol. 49, Issue 2 (Aug. 2004), p. 261-268.

Vignais, P.M., et al., 'Molecular biology of microbial hydrogenases', Curr. Issues Mol. Biol., 6(2), www.cimb.org, pp. 159-188, (2004).

Yadvika, S., et al., 'Enhancement of biogas production from solid substrates using different techniques—a review', 95 (2004), pp. 1-10.

Winters et al., "Bio-Solids Enhancements Resulting the Use of Hydrogen Peroxide for Hydrogen Sulfide Odor Control—The San Antonio Experience",(Abstract Only), WEFTEC, ©2006, 4487-4498, Published in 2006.

\* cited by examiner

METHODS AND DEVICE FOR ENHANCEMENT OF ANAEROBIC DIGESTION

CROSS-REFERENCE TO RELATED APPLICATIONS

This application claims the benefit of U.S. provisional application 61/028,264, filed Feb. 13, 2008, the entire contents of which are incorporated herein by reference.

TECHNICAL FIELD

Methods of treatment of wastewater and more particularly to methods of enhancing anaerobic digestion of wastewater are provided. A device for use in treatment of wastewater and more particularly in enhancement of anaerobic digestion is also provided. The methods and device have application in municipal wastewater treatment, agricultural operations, and biofuels production.

BACKGROUND

Many municipalities and industries, including agricultural facilities, treat solid and liquid waste streams in anaerobic treatment facilities. Anaerobic digestion relies upon anaerobic microorganisms, e.g., methanogens, to convert, for example, sewage sludge, industrial and municipal waste, and biomass material, to valuable biogases, principally methane. The process has advantages not only in its suitability for treating wastes having a high water content or difficulties in incineration, but also facilitates the recovery of methane as a source of clean energy and reduces the volume of residual solids requiring processing and disposal.

Large agricultural operations may utilize confinement barns to house a large number of livestock, such as swine, poultry or dairy cows, in a relatively small land area. These agricultural operations often experience potential pollution problems relating to the handling and treatment of manure and wastewater. For example, pollution problems associated with animal waste include nitrogen, phosphorus, solids, bacteria and foul odors that result from anaerobic storage of manures. Storage lagoons or basins are often created on sites of agricultural operations to accumulate and store the flushed wastewater, feces and urine until an appropriate time to distribute the wastes over the land. Typically, during the storage process, due to the large volume of animal waste entering the lagoon, there is insufficient oxygen present to support the growth of aerobic cultures and/or aerobic biological activity. The absence of the necessary oxygen and the highly concentrated manure constituents convert microbial growth in the lagoon to anaerobic activity. This anaerobic activity leads to what is commonly known as a "septic" lagoon. In a septic lagoon, a very foul odor is present from the production of hydrogen sulfide, organic-sulfide compounds, organic acids, etc. Environmental concerns in wastewater treatment of agricultural operations thus focus generally on odor and water quality issues.

One method of wastewater treatment involves the addition of iron to anaerobic digesters to control hydrogen sulfide, phosphate, and scaling, and to provide micronutrients. The added iron, however, is not regenerated to substantially economize its use. Aggressive oxidation of waste by, for example, extreme pressure, high temperature, and/or acidification, solubilizes particulates and chemically digests organic material but the conditions required of such processes are prohibitively expensive. Mild oxidation of raw wastewaters is inefficient for regenerating iron within waste sludges and present risks to anaerobic digesters. Treatment of waste with pressure, while effective at solubilizing particulate matter, does not result in the regeneration of iron.

Cost-effective and practical methods and apparatuses for wastewater treatment that maximize iron utility in a wastewater treatment system, enhance anaerobic digestion of wastewater solids, and improve yield of fuel and energy values are thus desirable.

SUMMARY

Provided herein are methods and apparatuses for enhancing anaerobic digestion of digester material and systems using the same. Digester material may comprise digester influent, digester effluent, settled solids from a digester, supernatant from a digester, or combinations thereof.

For example, methods for enhancing digestion of digester material in an anaerobic digester are provided. In some embodiments, the methods involve adding oxidant to digester material containing iron and pressurizing the digester material.

In some embodiments, the added oxidant provides dissolved oxygen. In some aspects, the step of pressurizing the digester material preferably elevates or sustains the dissolved oxygen concentration. The dissolved oxygen concentration of the digester material is preferably elevated or sustained relative to the dissolved oxygen concentration achieved upon initial addition of oxidant. The digester material preferably remains at natural pH and temperature.

In some aspects, the oxidant may be oxygen, hydrogen peroxide, or combinations thereof. The dose of oxidant is preferably about 10 milligrams of oxidant per liter of digester material to about 10,000 milligrams of oxidant per liter digester material. In some embodiments, oxidant is added to solids of the digester material prior to entry into the anaerobic digester. In some embodiments, oxidant is added to the supernatant of anaerobic digester effluent subsequent to dewatering but prior to being returned to the anaerobic digester to oxidize sulfide and ferrous iron to elemental sulfur and ferric iron.

In some embodiments, the digester material contains about 5 to about 5000 milligrams of iron per liter of digester material. The iron may be endogenous to the digester material or may be added. The iron that is added to the digester material may include ferrous chloride, ferric chloride, ferrous sulfate, ferric sulfate, or combinations thereof. Iron may be added at one or more points during the treatment process including the collection system, the treatment plant headworks, the primary clarifier influent, the primary thickener influent, the digester influent, or a recycle line to/from the digester.

In some embodiments, pressurization of the digester material involves subjecting the digester material to pumping, mixing, ultrasound, hydrodynamic cavitation, endogenous decomposition of hydrogen peroxide, or combinations thereof. For example, a static or moving mechanical mixer may be used to mix the digester material. As another nonlimiting example, digester material may be exposed to ultrasound produced by an ultrasound generator. The step of pressurizing preferably accelerates oxidation of sulfide and ferrous iron in the digester material to elemental sulfur and ferric iron. In some aspects, pressurizing involves a step of applying a moderate pressure of about 50 psig to about 350 psig to the digester material. In some embodiments, pressurizing further involves a step of applying a low pressure of about 5 to about 25 psig to the digester material. In preferred embodiments, the dissolved oxygen concentration of the digester material following the application of low pressure is less than about 10 milligrams per liter digester material.

In some embodiments, digester material and oxidant are pressurized within a pressure oxidizer device.

A pressure oxidizer device having a moderate pressure reactor is also provided. Pressure within the moderate pressure pipe reactor is preferably between about 50 psig and about 350 psig. The moderate pressure reactor of the pressure oxidizer device applies moderate pressure to digester material. In some embodiments, the pressure oxidizer device includes a low pressure reactor. Pressure within the low pressure reactor is preferably about 5 psig to about 25 psig. The low pressure reactor may be, for example, an aerobic bioreactor. In some embodiments, the pressure oxidizer device includes a central process controller.

Further provided are wastewater treatment systems employing the methods or comprising the pressure oxidizer devices described herein. In some embodiments, the wastewater treatment system includes a particle homogenizer positioned upstream, preferably immediately upstream, of the pressure oxidizer device. In some embodiments, the wastewater treatment system includes a particle homogenizer positioned downstream, preferably immediately downstream, of the pressure oxidizer device. Particles may be homogenized in the particle homogenizer by hydrodynamic cavitation, ultrasonification, or nozzles such as high pressure, high shear nozzles.

DETAILED DESCRIPTION OF ILLUSTRATIVE EMBODIMENTS

Figure 1:
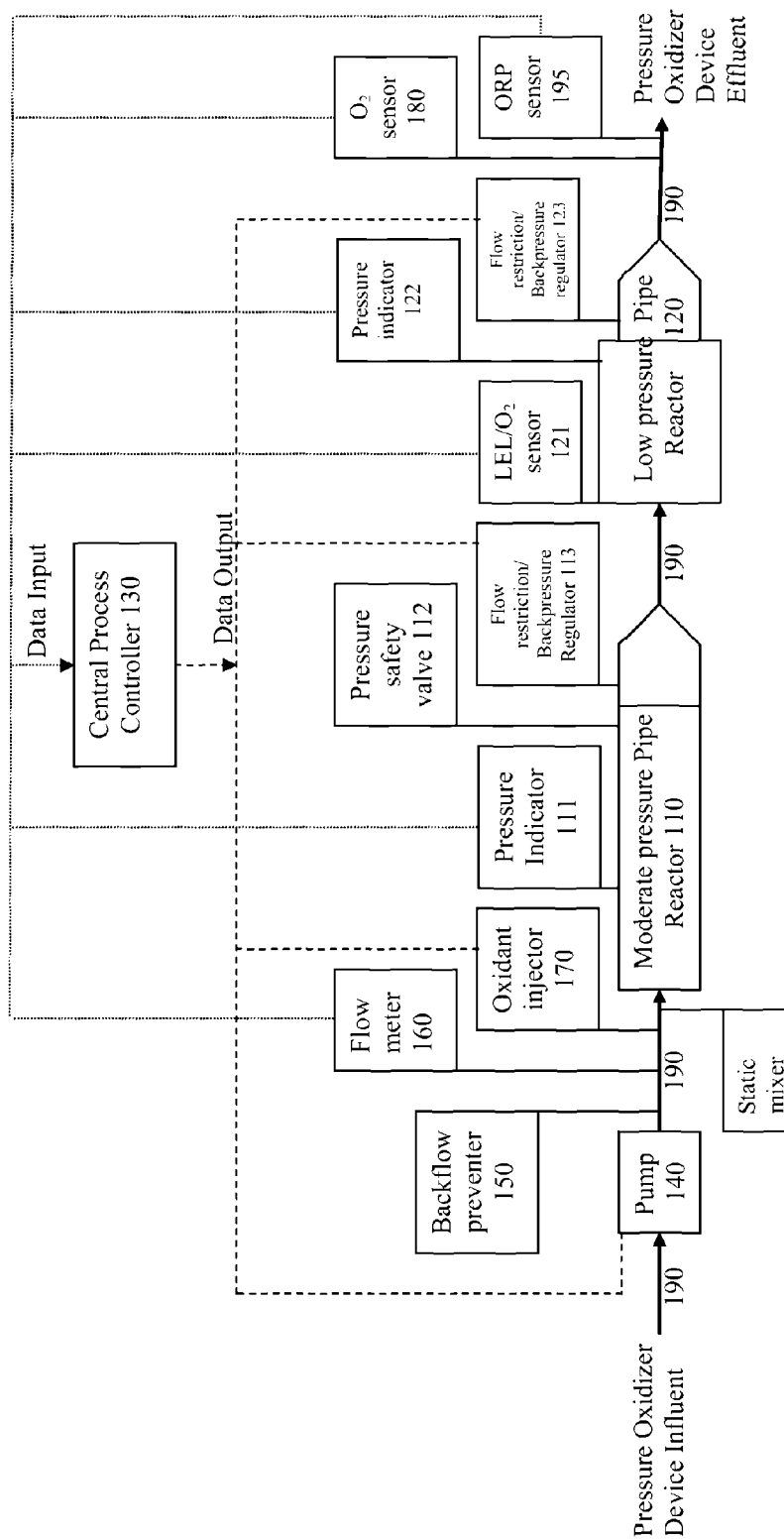
FIG. 1 illustrates an exemplary embodiment of a pressure oxidizer device according to the invention. The exemplified pressure oxidizer device 100 contains a moderate pressure pipe reactor 110 having a pressure safety valve 112, a pressure indicator 111, and a flow restriction/backpressure regulator 113. The pressure oxidizer device 100 also includes an oxygen sensor 180 and oxidation-reduction potential (ORP) sensor 195 positioned downstream of the moderate pressure pipe reactor 110 and low pressure pipe reactor 120. The low pressure pipe reactor 120 is connected to the moderate pressure pipe reactor 110 by reactor piping 190. The low pressure pipe reactor 120 includes a combination oxygen/Lower Explosive Limit ($O_2$/LEL) sensor 121, a pressure indicator 122, and a flow restriction/backpressure regulator 123. The pressure oxidizer device 100 includes a pump 140 which is connected to moderate pressure pipe reactor 110 by reactor piping 190, which includes a flow meter 160, a static mixer 185, a backflow preventer 150, and an oxidant injector 170. The pressure oxidizer device 100 is connected to an anaerobic digester (not shown) by reactor piping 190 from which digester material is received into the pressure oxidizer device 100. The pressure oxidizer device also comprises a central process controller 130 which receives data input from the flow meter 160, pressure indicators 111 and 122, $O_2$/LEL sensor 121, ORP sensor 195, and $O_2$ sensor 180. The central process controller 130 controls pressure within the moderate pressure pipe reactor 110 by relating output data to a flow restriction/backpressure regulator 113 of the pressure oxidizer device 100. The central process controller 130 controls flow rate by relating output data to flow restriction/backpressure regulators 113 and 123 and to the pump 140. The central process controller 130 controls the amount of oxidant addition within the pressure oxidizer device 100 by relating output data to the oxidant injector 170. The central process controller 130 controls operating pressure within the moderate pressure pipe reactor 110 by relating output data to the flow restriction/backpressure regulator 113 positioned within the moderate pressure pipe reactor 110. The central process controller 130 also controls operating pressure within the low pressure pipe reactor 120 by relating output data to the flow restriction/backpressure regulator 123.

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural references unless the content clearly dictates otherwise.

The term "about" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Aerobic digestion" is a waste treatment process in which dissolved biodegradable material is used to support the growth of bacteria that converts the dissolved biodegradable material into solid form (comprising a mass of bacteria) known as "waste activated sludge." In aerobic digestion, aerobic and facultative microorganisms use oxygen and obtain energy from biodegradable organic matter. The end products of aerobic digestion typically are carbon dioxide, water, and recalcitrant substances (such as polysaccharides, glycoproteins, lignins, and bacterial cells). An "aerobic digester" refers to the component(s) of a wastewater treatment system in which aerobic digestion of waste occurs.

"Anaerobic digestion" is a waste treatment process in which facultative and strict anaerobes simultaneously hydrolyze complex organics and assimilate intermediate volatile organic acids. Anaerobic digestion generally occurs in four stages: hydrolysis, acidogenesis, acetogenesis, and methanogenesis. These stages result from the biological treatment of organic waste by various microorganisms including acetogens and methanogens. The end products of anaerobic digestion typically are $CO_2$, $CH_4$, and $NH_3$. An "anaerobic digester" refers to the component(s) of a wastewater treatment system in which anaerobic digestion of waste occurs. Anaerobic digesters include Stage 1 (acid-forming) and Stage 2 (methane-forming) digesters, as well as digesters in which both stages are combined into a single vessel.

"Backflow preventer" refers to a mechanical valve designed so that the flow of waste can proceed only in one direction, even if the pressure downstream of the valve is greater than that upstream of the valve.

"Dewatering" refers to separation of a wastewater stream or, in some embodiments, digester material, into substantially separate liquid fractions and solid fractions. Dewatering may be performed by any means known in the art, such as but not limited to, a centrifuge, a filter, or a settling basin. The liquid fraction is referred to herein as supernatant, or more specifically, centrate or filtrate. The solid fraction may be referred to as a solids cake. A "dewatering component" refers to any means capable of dewatering the digester material, including, for example, a centrifuge or a filter.

"Digester material" generally refers to waste material that is to be, is being, or has been digested by an anaerobic digester. Digester material may comprise one or more of influent solids to a thickening device upstream or prior to the anaerobic digester, anaerobic digester influent, anaerobic digester effluent, or material within an anaerobic digester (including, for example, settled solids from a digester, supernatant from a digester, and/or material within a recycle loop). The digester material may comprise solids (solid digester material) or liquids (liquid digester material; e.g., supernatant, centrate, filtrate) or both.

"Digestion" refers to any process known to those skilled in the art for degradation of wastewater solids. The term includes, for example, anaerobic digestion and aerobic digestion.

"Downstream" refers to a position within the wastewater treatment process or system located after the reference position.

"Effluent" refers to material exiting a reference component of the wastewater treatment system. For example, "anaerobic digester effluent" refers to material that has exited an anaerobic digester.

"Enhancement of anaerobic digestion" refers to improved anaerobic digestion including, for example, reduction of solids, increased methane production, and/or sludge stabilization (i.e., decreased bioactivity and reduction of pathogens and odors).

"Flow restriction/backpressure regulator" refers to a mechanical valve that may be adjusted between 0% and 100% open (or closed), whereby increasing (or decreasing) the % closure increases (or decreases) the pressure differential between the upstream and downstream sides of the valve, and thereby reduces (or increases) the rate of process water flow through the valve. The closure position of a flow restriction/backpressure regulator may be adjusted either electronically or mechanically.

"Flow meter" refers to a device that measures the rate of process water flow and provides a visual and/or electronic output of the flow expressed as unit volume per time, for example, gallons per minute. Examples of flow meters include ultrasonic, turbine, and electromagnetic types.

"Headspace" refers to the vapor cavity that exists above the liquid boundary within a partially filled vessel, container, or pipe.

"Headworks" of a wastewater treatment plant refers to the location within a wastewater treatment plant at which wastewater is received from a collection system.

"Influent" refers to material entering a reference component of the wastewater treatment process or system. For example, "anaerobic digester influent" refers to material prior to its entry to an anaerobic digester.

"Oxidant" refers to an agent capable of oxidation.

"$O_2$ sensor" as used herein refers to a means for determining $O_2$ level, for example, within digester material or in the headspace above the digester material.

"Lower Explosive Limit (or LEL) sensor" as used herein refers to a sensor or means for determining the combustibility of a vapor as relates to the concentration of fuel therein.

"Oxidation—Reduction Potential (ORP) sensor" as used herein refers to a sensor or means for determining the relative balance of oxidation and reduction powers within a wastewater.

As used herein, "Reactor" refers to a vessel or pipe in which transformation of its contents occurs. The reactor may contain digester material, iron, and oxidant.

"Plug flow" refers to sequential progression of the reactor contents in that the material passes or flows in a sequential manner from the inlet to the outlet.

A "tank reactor" refers to a reactor that is comprised of a vessel. Tank reactors may be baffled or completely mixed, and optionally deployed in series in order to improve plug flow characteristics.

A "pipe reactor" refers to a reactor in the form of piping. A "plug-flow reactor" refers to a reactor through which digester material passes or flows in a sequential manner from the inlet to the outlet. The plug-flow configuration provides a gradient of pressure and/or dissolved oxygen levels that encourage complementary chemical and biological reactions. A pipe reactor may contain aerobic and/or anaerobic microbial populations, or little or no microbial population of either.

The term "pressurize" refers to application of pressure. Pressurization may be by means of a mechanical pump increasing the rate of either liquid or vapor flowing into the reactor, and/or a flow restriction/backpressure regulator reducing the rate of either liquid or vapor flowing out of the reactor.

"Moderate pressure" refers to pressure of about 50 psig to about 350 psig, preferably about 75 psig to about 250 psig, and more preferably about 100 psig to about 200 psig. "Moderately pressurized digester material" refers to digester material to which moderate pressure is being or has been applied. "Low pressure" refers to pressure of about 5 psig to about 25 psig. "Low pressurized digester material" refers to digester material to which low pressure is being or has been applied.

A "pressure indicator" refers to any means capable of determining pressure within a component of a wastewater treatment system, including reactor piping and/or a pipe reactor.

A "clarifier" as used herein refers to a component of the wastewater treatment system in which sedimentation of solids is allowed to occur from the bulk water, and includes, for example, tanks, basins, etc. A "thickener" as used herein refers to for example, a clarifier, gravity belt thickener, or dissolved air flotation device that is positioned downstream of a clarifier and serves to increase the solids content of the settled solids portion separated in the upstream clarifier.

A "primary clarifier/primary thickener" refers to a clarifier or thickener that processes water or solids that have undergone (or are undergoing) physical (or primary) treatment, as opposed to water or solids that have undergone (or are undergoing) biological (or secondary) treatment.

"Reactor piping" refers to transfer piping, conduits, and the like that connect the various components of the devices and/or systems described herein. The type of connection depends upon a variety of factors, for example, the need to prevent the escape of biogas, odors, and the desire to prevent the loss of heat. The reactor piping may contain, for example, digester material, iron, and oxidant.

"Recycle loop" or "recirculation loop" refers to reactor piping that receives waste material from and returns waste material to a component of the wastewater treatment system. For example, a recycle loop of an anaerobic digester refers to reactor piping that receives digester material from an anaerobic digester and returns the material to the anaerobic digester.

"Recycle solids flow within a recycle loop relative to total digester contents" refers to the percentage volume amount of digester material that enters the recycle loop relative to the total digester contents, and is expressed as turnovers per day.

As used herein, "regenerates iron" means the oxidation of ferrous sulfide to ferrous ions and elemental sulfur, and/or the oxidation of ferrous ions to ferric ions.

"Residence time" as defined herein refers to the amount of time lapsed between point of entry and point of exit of the digester material in the specified wastewater treatment component. The phrase "subjecting to" as used herein, for example, in reference to digester material, means to expose or to cause or force to undergo. For example, the phrase "subjecting the digester material to pumping, mixing, ultrasound, hydrodynamic cavitation, endogenous decomposition of hydrogen peroxide, or combinations thereof" means to cause the digester material to undergo or to expose the digester material to pumping, mixing, ultrasound, hydrodynamic cavitation, endogenous decomposition of hydrogen peroxide, or combinations thereof.

"Total contents of an anaerobic digester" or "total digester contents" refer to material comprising both settled solids and supernatant from a primary anaerobic digester. "Supernatant" refers to a liquid portion of wastewater from which solids have separated and includes decant, centrate, and filtrate.

"Upstream" refers to a position within the wastewater treatment process or system located prior to the reference position.

As used herein, the term "vapor" refers to the gaseous portion above the surface of the process water (or solids).

"Waste material" or "waste" refers to liquid and/or solid waste, for example, municipal waste or agricultural operation/livestock waste. Waste material includes digester material and waste activated sludge.

"Endocrine disruptors" refers to exogenous substances or mixtures that alter function(s) of the endocrine system and consequently cause adverse health effects in an intact organism or its progeny or (sub)populations.

The present invention provides a flexible means to provide available ferrous and/or ferric ions to the digestion process as may be needed, without the provision of external iron compounds. Specifically, the present invention provides, in addition to ferrous ions, ferric ions that bind preferentially with phosphate to form an amorphous precipitate instead of a crystalline scale, and thereby minimizes problems associated with both vivianite and struvite while providing ferrous ions for hydrogen sulfide control and micronutrient.

Methods Described Herein

The methods described herein may advantageously enhance anaerobic digestion of wastewater solids and/or improve production of fuel and energy values. The methods may be applied to municipal wastewater and/or wastewater generated from agricultural operations. The methods may be used in municipal wastewater treatment plants and agricultural/livestock operations. The methods may also be used in biofuels production, e.g., cellulosic ethanol plants.

The methods described herein may also reduce solids conditioning and dewatering costs by reducing the amount of solids requiring treatment and thereby lowering the demand for polymer conditioning agent. The methods may lower solids disposal costs by reducing the mass of dry solids requiring transport and/or destruction, increasing the cake solids content, and improving the solids cake quality (i.e., reducing odors and lowering pathogen and endocrine disruptor content). The methods described herein may also improve supernatant quality by reducing odors, lowering soluble microbial polymer content, and lowering phosphate levels.

The methods described herein may reduce the need for capital outlay by wastewater treatment plants required for capacity expansion.

Figure 2:
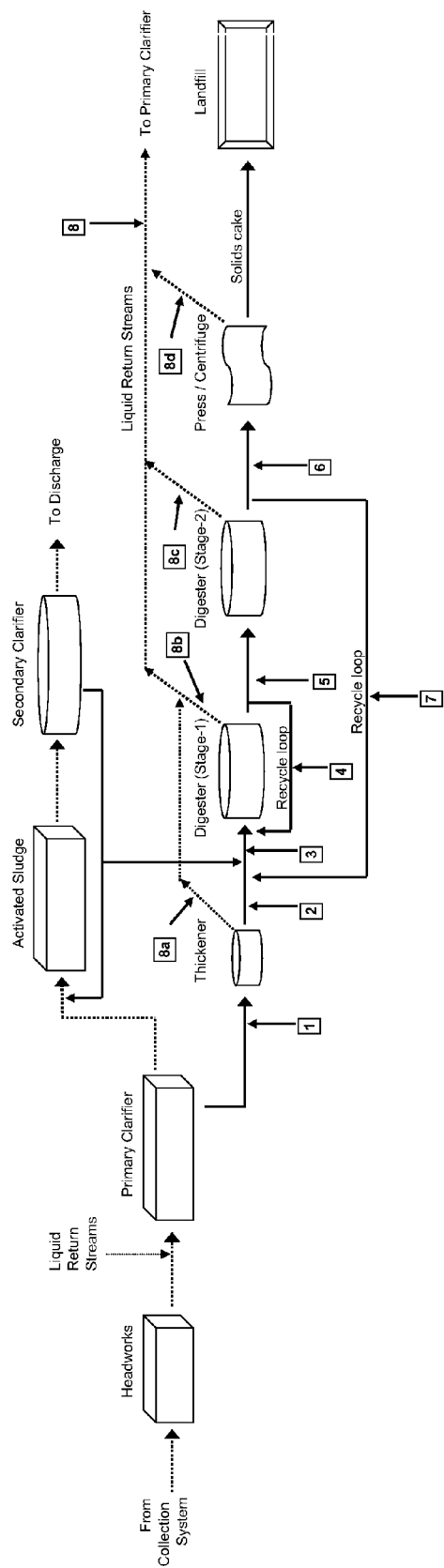
FIG. 2 illustrates an exemplary embodiment of a wastewater treatment system according to the invention, wherein a two-stage digester system is used. Pressure oxidation, for example by way of a pressure oxidizer device described herein, may be applied at one or more points indicated by numbering 1 through 8d: 1) influent to the primary thickener, 2) effluent from the primary thickener, 3) influent to the Stage 1 digester, 4) digester material within a recycle loop within a Stage 1 digester, 5) influent to the Stage 2 digester, 6) effluent from the Stage 2 digester, 7) digester material within a recycle loop between a Stage 2 and Stage 1 digester, and 8) various liquid flows associated with 8a) decant from a primary thickener, 8b) decant from the Stage 1 digester, 8c) decant from the Stage 2 digester, and 8d) filtrate or centrate from the mechanical dewatering device. A dotted line is used to indicate a liquids stream; a solid line is used to indicate a solids stream. It should be understood that pressure oxidizer device and methods described herein may likewise be applied where a single-stage digester system is used, in which case the Digester (Stage 1) and Digester (Stage 2) become a single vessel and points 7, 6, and 8c become points 4, 5, and 8b, respectively.

Pressure Oxidation. Methods of enhancing digestion of digester material of an anaerobic digester involve pressurizing at least a portion of digester material and oxidant. In some embodiments, oxidant is preferably added to digester material, as shown in FIG. 2, at one or more points: 1) influent to the primary thickener, 2) effluent from the primary thickener, 3) influent to the Stage 1 digester, 4) digester material within a recycle loop within a Stage 1 digester, 5) influent to the Stage 2 digester, 6) effluent from the Stage 2 digester, 7) digester material within a recycle loop between a Stage 2 and Stage 1 digester, and 8) various liquid flows associated with 8a) decant from a primary thickener, 8b) decant from the Stage 1 digester, 8c) decant from the Stage 2 digester, and 8d) filtrate or centrate from the mechanical dewatering device. The digester material contains or is made to contain iron (e.g., the iron concentration of the digester material is adjusted). Moderate pressurization of the digester material preferably elevates or sustains the dissolved oxygen concentration therein. Said dissolved oxygen levels may be 5 to 500 mg/L, preferably 10 to 250 mg/L, and most preferably 25 to 100 mg/L. In the case where the oxidant is hydrogen peroxide, the dissolved oxygen may be supplied through the decomposition of hydrogen peroxide within the digester material. Pressurization of the digester material preferably accelerates oxidation of sulfide and ferrous ions in the digester material to elemental sulfur and ferric ion, respectively.

While the methods prescribed in this invention are directed toward utilizing pressure to enhance the $H_2O_2$ oxidation of sulfide and $Fe^{2+}$, it should be apparent that any method that causes the pressurization of any part of the digester material that contains $H_2O_2$ and iron will achieve similar effect. For example, the methods described herein may employ moderate pressurization as may occur by any known means, including an increase in temperature, a pump, a reduction in volume, a restricted orifice discharge, a static mechanical mixer, a moving mechanical mixer, an ultrasound generator, and/or endogenous decomposition of hydrogen peroxide, or combinations thereof (for example, a mechanical pump and a restricted orifice discharge).

While not wishing to be bound by any one mechanism of action, it is believed that pressure oxidation removes growth inhibitors (e.g., inorganic and organic sulfides, and o-phosphate); provides electron acceptors (e.g., ferric iron and elemental sulfur); and frees micronutrients (e.g., trace metals such as cobalt, nickel, and iron); thereby facilitating the metabolism of substances that may otherwise, build up, pass through, and/or inhibit digestion. Ferric iron is a source of electrons in the absence of oxygen. Ferric iron also binds more tightly to thiols and phosphates than ferrous iron, and ferric iron improves floc formation and enhances protein degradation.

The methods described herein increase methane production relative to conventional digestion. Dissolved and total sulfide can scavenge Fe and other micronutrients. Excessive ortho-phosphate levels can also reduce the efficiency of methane production. Approximately 65% of methane produced by conventional digestion comes from acidotropic methanogens, whereas approximately 35% is produced by $CO_2/H_2$ metabolism. Addition of ferrous iron to pure cultures of $CO_2/H_2$ methanogens increases efficiency of methane production from approximately 45% to 100%. It is thought that, by reducing sulfide and/or o-$PO_4^-$ levels, and increasing efficiency of methane production by $CO_2/H_2$ methanogens, the present invention improves the yield of methane production.

In some embodiments described herein, the methods of enhancing anaerobic digestion may involve pressurizing digester material. In preferred embodiments, moderate pressure is applied to the digester material comprising iron and oxidant. In preferred embodiments, no acidifying agent is added to the digester material. In some embodiments, an alkalinity agent may be added to the digester material. In preferred embodiments, the moderate pressure is about 50 psig to about 350 psig, more preferably about 75 psig to about 250 psig, and even more preferably about 100 psig to about 200 psig.

In some embodiments described herein, the methods of enhancing anaerobic digestion further comprise application of low pressure to the digester material following pressurization, e.g., moderate pressurization. Low pressure applied to the digester material is preferably from about 5 to about 25 psig. The operating pressure applied to the digester material preferably decreases between the point of moderate pressurization of the digester material and the point of low pressurization of the digester material at a rate sufficient to prevent evolution of $O_2$. In preferred embodiments, low pressurization of the digester material is performed aerobically. For example, low pressurization of the digester material may be applied in an aerobic reactor, preferably a fixed film aerobic reactor wherein growth of aerobic microorganisms ("aerobic biogrowth") occurs via a biofilm attached to a fixed medium. Examples of such fixed media include structured plastic packing material, ceramic, stone or wood material, and layered course screens (either metal or plastic).

In some embodiments, for example where moderate pressure oxidation is followed by low pressure application, the concentration of oxidant in digester material following moderate pressurization is less than about 200 mg/L, preferably less than about 100 mg/L, and more preferably less than about 50 mg/L. In preferred embodiments, the concentration of oxidant in digester material following moderate and/or low pressurization yet prior to addition of the digester material to the digester is less than about 10 mg/L, and preferably less than about 1 mg/L.

In embodiments described herein in which low pressure is applied to digester material aerobically, dissolved oxygen in the digester material may be provided by the oxidant. In some embodiments, dissolved oxygen, for example from $H_2O_2$ decomposition, is added to the low pressurized digester material being treated aerobically. For example, dissolved oxygen may be fed to the low pressure aerobic reactor. In some embodiments, the low pressure reactor is a tank reactor, either baffled or continuously stirred. In preferred embodiments described herein, the dissolved oxygen concentration of digester material following low pressurization is less than about 10 mg/L, more preferably less than about 3 mg/L, and most preferably less than about 1 mg/L.

In some embodiments, digester material to be low pressurized comprises moderately pressurized digester material and waste activated sludge. In preferred embodiments, aerobic microorganisms of the waste activated sludge seed or propagate the biofilm of a fixed film aerobic low pressure reactor.

In the methods described herein, the iron concentration of the digester material is about 5 to about 5000 mg/L, preferably about 25 to about 2500 mg/L, and more preferably about 100 to about 1000 mg/L. In some embodiments, the iron concentration of the digester material is endogenously within these concentration ranges. An endogenous iron concentration within the desired iron concentration range means that the digester material does not require iron addition or removal to achieve such desired iron concentration within the preferred range. Alternatively, the iron concentration of the digester material may be adjusted to a desired concentration within the ranges. "Adjusted," as used herein, means that iron may be added or removed from the digester material or the digester material may be diluted or concentrated, as the case may be, to reach a desired iron concentration. Adjustment of iron concentration (e.g., the addition of iron to digester material) may be performed at one or more locations including the collection system, the treatment plant headworks, the primary clarifier influent, the primary thickener influent, the digester influent, and a recycle loop to or from the digester. To increase the iron concentration in the digester, one may, e.g., dose a solution of iron directly into the digester or into one or more upstream processes; whereas, to decrease the iron concentration, one may e.g., oxidize $Fe^{2+}$ to insoluble ferric ion ($Fe^{3+}$) prior dewatering the effluent solids thereby partitioning more of the iron into the dewatered solids cake. For example, oxidant may be added to supernatant of anaerobic digester effluent subsequent to dewatering but prior to being returned to the anaerobic digester.

Iron added to digester material may be in the form of ferrous or ferric salts including but not limited to ferrous chloride, ferric chloride, ferrous sulfate, ferric sulfate, and combinations thereof.

The anaerobic digester in the methods described herein preferably is a primary anaerobic digester, for example, a Stage 1, Stage 2, or combined anaerobic digester. In some embodiments, the digester may be mesophilic or thermophilic. The portion of digester material subjected to pressure oxidation during a 24 hour period, relative to the total digester contents, may be 0.1% to 500%, preferably 0.5% to 100%, and more preferably 1% to 25%.

In preferred embodiments, the pH and temperature of the digester material upon or following oxidant addition and pressurization are substantially the same as those of the "natural digester material," i.e., digester material to which pressure has not been applied. "Natural pH" in reference to digester material refers to the pH of digester material to which pressure has not been applied to sustain the dissolved oxygen concentration achieved upon addition of the oxidant. Natural pH is preferably a pH less than about 10. For example, in preferred embodiments, no addition of acidifying agent occurs; however, alkalinity agents, e.g., sodium bicarbonate or sodium hydroxide, may be added to the digester material before or simultaneous to oxidant addition and/or pressurization. "Natural temperature" in reference to digester material refers to the temperature of digester material to which pressure to sustain the dissolved oxygen concentration achieved upon addition of the oxidant has not been applied. In some embodiments, the temperature may be adjusted by heat input or removal to achieve natural temperature. The temperature of the digester material may be adjusted before, simultaneous to, or subsequent to pressurization.

The oxidant used in accordance with the methods and devices described herein preferably includes $H_2O_2$, oxygen ($O_2$), and combinations thereof. The dose of oxidant combined with digester material is preferably about 10 mg/L to about 10,000 mg/L digester material, more preferably about 50 mg/L to about 5000 mg/L digester material, and most preferably about 100 mg/L to about 1000 mg/L digester material. In preferred forms, the digester material is substantially completely oxidized by the oxidant. As used herein, "substantially completely" means at least 90%, at least 95%, at least 98%, at least 99%, or 100% complete, as determined by the residual levels of sulfide and/or ferrous iron therein. In some embodiments, the concentration of oxidant in the digester material following moderate pressurization is less than about 200 mg/L, preferably less than about 100 mg/L, and more preferably less than about 50 mg/L. In preferred embodiments, the concentration of oxidant in digester material following moderate pressurization and low pressurization is less than about 10 mg/L, preferably less than about 5 mg/L, and more preferably less than about 1 mg/L.

In some preferred embodiments, oxidant is added to the digester material prior to entry of the digester material into the anaerobic digester. In some preferred embodiments, oxidant is added to the supernatant of anaerobic digester effluent subsequent to dewatering but prior to return to the anaerobic digester, for example, to oxidize sulfide and ferrous iron to elemental sulfur and ferric ion.

In some embodiments, oxidant is added to digester material to be moderately pressurized. The oxidant may be added by injection to the digester material, for example, prior to an in-line static mixer. The rate of addition of the oxidant to digester material is preferably limited by at least one of the $O_2$ level in the digester vapor and the $O_2$ level in vapors of the pressure oxidizer device headspace at or downstream of the point of addition of the oxidant.

Pressurization of digester material comprising iron and oxidant accelerates oxidation of sulfide and/or ferrous iron within the digester material. By making ferrous and/or ferric iron more readily available in the wastewater treatment process, the methods described herein maximize iron utility in a wastewater treatment system. In the case where the oxidant is $H_2O_2$, pressurization of digester material minimizes $H_2O_2$ loss to decomposition. Pressure oxidation of digester material also increases solubility of byproduct $O_2$, thereby allowing the recovery of oxidant value otherwise lost to the headspace. An operating pressure of approximately 100-200 psig is preferable based on the solubility of $O_2$ in water at 25 degrees Celsius:

| | |
|---|---|
| 15 psig | 8.3 mg/L |
| 29 psig | 16.5 mg/L |
| 59 psig | 33 mg/L. |

Pressurization thus improves the efficiency of destroying sulfides ($H_2S$) and mercaptans produced by the digester material, thereby controlling odor and improving biogas quality. The methods described herein ensure that a larger portion of Fe is available for the purposes of $H_2S$ and mercaptan control, phosphate removal, micronutrient supply, and flocculation.

Additionally, $Fe^{+3}$ reduces to $Fe^{+2}$ in anoxic environments, especially in the presence of sulfide. Conventional iron addition practices thus do not provide sufficient $Fe^{+3}$ residuals within anaerobic digesters. This is especially the case in view of retention times within anaerobic digesters of approximately 20-30 days.

Pressure oxidation of digester material according to the present invention utilizes oxygen, either directly (as $O_2$) or indirectly (as $H_2O_2$), to drive oxidation of sulfide to elemental sulfur and of ferrous iron ($Fe^{+2}$) to ferric ($Fe^{+3}$) iron, thereby providing a continuous feed of $Fe^{+3}$ to the digester. For example, continuous recirculation and regeneration of Fe can ensure a constant Fe delivery greater than 10 times conventional Fe addition by increasing the effective Fe turnover rate to about once every few days or less.

Further treatment benefits achieved by the methods described herein include scale control. Improved struvite ($MgNH_4PO_4$) control is achieved according to the methods described herein because $Fe^{+3}$ binds more strongly to orthophosphate than $Fe^{+2}$, thereby reducing struvite formation. Because $Fe^{+3}$ disrupts the crystalline structure of vivianite ($Fe_3(PO_4)_2$), the methods described herein can also reduce vivianite scaling. $Fe^{+3}$ also lowers the levels of volatile mercaptans (e.g., methyl mercaptan), thereby reducing organic odors, whereas Fe does so only minimally.

Pressure oxidation may be applied at one or more points in the solids processing operation. In a preferred embodiment as shown in FIG. 2, pressure oxidation may occur upstream of a primary thickener, upstream of a Stage 1 (acid-forming) anaerobic digester, between a Stage 1 anaerobic digester and a Stage 2 (methane-forming) anaerobic digester, or within a recycle loop of connecting one or more anaerobic digester(s). Pressure oxidation may also be applied to the effluent from an anaerobic digester prior to dewatering, or to a supernatant derived from a primary thickener, anaerobic digester, or dewatering device. In embodiments in which pressure oxidation is performed or applied within a recycle loop of an anaerobic digester, the recycle solids flow relative to the total digester contents is preferably about 0.1% to about 500% per day, more preferably about 0.5% to about 100% per day, and most preferably about 1% to about 25% per day.

Moderate pressurization of digester material lasts for about 0.5 to about 60 minutes, preferably about 1 to about 30 minutes, and more preferably about 2 to about 15 minutes.

In some embodiments, moderate pressurization and low pressurization of digester material preferably lasts for about 1 to about 120 minutes, more preferably about 3 to about 60 minutes, and most preferably about 5 to about 30 minutes.

Digester material following pressurization may be combined with digester material prior to or upon entry into the anaerobic digester, thereby generating combined digester material. The dissolved oxygen concentration in the combined digester material is preferably less than about 1 mg/L. $H_2O_2$ concentration in the combined digester material is preferably less than about 1 mg/L. More preferably, the dissolved oxygen concentration in the combined digester material is less than about 1 mg/L and the $H_2O_2$ concentration in the combined digester material is less than about 1 mg/L, and the ORP in the combined digester material is less than about 50 mV, preferably less than about 0 mV, and more preferably less than about −100 mV.

Digester material preceding or following addition of oxidant and application of moderate pressure may also be subjected to particle homogenization processes such as hydrodynamic cavitation, ultrasonification, or conventional high-pressure, high shear nozzles that break up particulates/bioflocs and disrupt microbial cell membranes.

Pressure Oxidizer Device

Further provided herein is a pressure oxidizer device. The pressure oxidizer device described herein includes one or more reactors in series so as to provide plug flow conditions. Said plug flow reactors may thus be sequential batch reactors or sequential continuously-stirred tank reactors, baffled tank reactors, or pipe reactors. In some embodiments, the pressure oxidizer device is a sequential biological reactor that alternates or combines anaerobic and aerobic digestion in a single vessel. See, e.g., U.S. Pat. Nos. 5,599,451 and 5,514,278, incorporated herein by reference. In some embodiments, the moderate pressure reactor contains a restricted region, e.g., a restricted orifice discharge. In the preferred embodiment, said reactors are pipe reactors. In at least one of the reactors, designated the moderate pressure reactor, moderate pressure is applied to digester material. The operating pressure within the moderate pressure reactor is preferably from about 50 psig to about 350 psig, more preferably from about 75 psig to about 250 psig, and even more preferably from about 100 psig to about 200 psig. The moderate pressure reactor is preferably a plug flow reactor. In some embodiments the moderate pressure reactor includes at least one of a pressure safety valve, pressure indicator, and/or flow restriction/backpressure regulator. The pressure oxidizer device may include an LEL/oxygen sensor positioned downstream of the moderate pressure reactor.

In one variation, the pressure oxidizer device contains at least one reactor in addition to the moderate pressure reactor. The additional reactor may be, for example, a pipe reactor or tank reactor. In some embodiments, the additional reactor is a low pressure reactor. Operating pressures within the low pressure reactor are preferably from about 5 psig to about 25 psig. The low pressure reactor is preferably connected to the moderate pressure reactor by reactor piping. In some embodiments, the low pressure reactor preferably is a plug flow reactor. The low pressure reactor is preferably an aerobic biological reactor, more preferably a fixed film aerobic biological reactor. In some embodiments, the low pressure reactor includes an oxygen sensor and oxidation-reduction potential sensor. In some embodiments, the low pressure reactor comprises a pressure indicator. In some embodiments, the low pressure reactor comprises a flow restriction/backpressure regulator. In some embodiments, dissolved oxygen, for example from $H_2O_2$ decomposition, is fed to the low pressure aerobic reactor. In some embodiments, the low pressure reactor is a tank reactor, either baffled or continuously stirred. In preferred embodiments described herein, the dissolved oxygen concentration of effluent of the low pressure reactor is less than about 10 mg/L, preferably less than about 3 mg/L, and more preferably less than about 1 mg/L, and the ORP in the combined digester material is less than about 50 mV, preferably less than about 0 mV, and more preferably less than about −100 mV.

In some embodiments, influent of the low pressure reactor preferably comprises effluent of the moderate pressure reactor and waste activated sludge. In preferred embodiments, aerobic microorganisms of the waste activated sludge seed or propagate the biofilm of a fixed film aerobic low pressure reactor.

In some embodiments, for example where moderate pressure oxidation is followed by low pressure application, the concentration of oxidant in effluent of the moderate pressure reactor of the pressure oxidizer device is less than about 200 mg/L, preferably less than about 100 mg/L, and more preferably less than about 50 mg/L. In preferred embodiments, particularly those in which the pressure oxidizer device comprises more than one reactor, the concentration of oxidant in effluent of the pressure oxidizer device is less than about 10 mg/L, and preferably less than about 1 mg/L.

In some embodiments, oxidant is added to influent of the moderate pressure reactor of the pressure oxidizer device. The oxidant may, for example, be added by injection into the moderate pressure reactor. The rate of addition of the oxidant to influent of the moderate pressure reactor is preferably limited by at least one of the $O_2$ level in the digester vapor and the $O_2$ level in vapors of the pressure oxidizer device headspace at or downstream of the point of addition of the oxidant.

In some embodiments, the pressure oxidizer device is connected to an anaerobic digester by reactor piping. Reactor piping of the pressure oxidizer device preferably includes at least one of a flow meter, a backflow preventer, and/or an oxidant injector. The pressure oxidizer device may receive through the reactor piping digester material comprising one or more of digester influent, digester effluent, settled solids from a digester, or supernatant from the digester.

The pressure oxidizer device preferably comprises one or more pumps. A pump is preferably positioned upstream of the moderate pressure reactor. The pump pushes the digester material through the pressure oxidizer device.

The pressure oxidizer device preferably comprises a central process controller. The central process controller preferably comprises at least one storage area for program code and data; a processor for executing the program code, wherein the program code directs the central process controller to perform functions including receiving data input from a component of the pressure oxidizer device, comparing the received data input to one or more criteria; and relating to another component of the pressure oxidizer device data output. The central process controller may receive data input from one or more of a flow meter, a pressure indicator, an ORP sensor, and a LEL/$O_2$ sensor of the pressure oxidizer device. The data input for example may comprise one or more of flow rate, pressure, LEL, ORP, or $O_2$ level.

The central process controller may include hardware components such as a processor, a graphics card, a storage component, a memory component, a memory card reader, an antenna, a communication port, a disc drive, or the like. The central process controller may also include software components such as an operating system that may control the hardware components. The central process controller may include any other suitable components such that the central process controller may receive data input and transmit that data input to a user interface. According to example embodiments, the central process controller may be a computer, a server, or the like.

The central process controller may control pressure within the moderate pressure reactor by relating output data to a flow restriction/backpressure regulator of the pressure oxidizer device.

The central process controller may control flow rate by relating output data to a flow restriction/backpressure regulator or to a pump of the pressure oxidizer device. In some embodiments of the pressure oxidizer device, the central process controller relates data output to a flow restriction/backpressure regulator to maintain the recycle solids flow within the pressure oxidizer device relative to the total anaerobic digester contents to about 0.1% to about 500% per day, preferably about 0.5% to about 100% per day, more preferably about 1% to about 25% per day. The pressure oxidizer device preferably comprises a user interface.

In some embodiments, the central process controller controls the amount of oxidant addition within said pressure oxidizer device by relating output data to an oxidant injector. For example, the central process controller may relate output data to an oxidant injector to add oxidant at a dose of about 10 to about 10,000 mg/L digester material, preferably at a dose of about 50 to about 5000 mg/L digester material, and more preferably at a dose of about 100 to about 1000 mg/L digester material.

In some aspects, the central process controller controls operating pressure within the moderate pressure reactor by relating output data to a flow restriction/backpressure regulator positioned within the moderate pressure reactor. For example, the central process controller may relate output data to the flow restriction/backpressure regulator to adjust or regulate operating pressure within the moderate pressure reactor to about 50 psig to about 350 psig, preferably about 75 psig to about 250 psig, and more preferably about 100 psig to about 200 psig.

In some aspects the central process controller controls operating pressure within the low pressure reactor by relating output data to a flow restriction/backpressure regulator positioned within the low pressure reactor. For example, the central process controller may relate output data to the flow restriction/backpressure regulator to adjust or regulate operating pressure within the low pressure reactor to about 5 psig to about 25 psig.

Pressure oxidation may be applied at one or more points in the solids processing operation. In a preferred embodiment as shown in FIG. 2, the pressure oxidizer device may be positioned at one or more points indicated by numbering 1 through 8d: 1) influent to the primary thickener, 2) effluent from the primary thickener, 3) influent to the Stage 1 digester, 4) digester material within a recycle loop within a Stage 1 digester, 5) influent to the Stage 2 digester, 6) effluent from the Stage 2 digester, 7) digester material within a recycle loop between a Stage 2 and Stage 1 digester, and 8) the various liquid flows associated with 8a) decant from a primary thickener, 8b) decant from the Stage 1 digester, 8c) decant from the Stage 2 digester, and 8d) filtrate or centrate from the mechanical dewatering device. It should be understood that the methods and devices described herein may likewise be applied where a single-stage digester system is used, in which case the Digester (Stage 1) and Digester (Stage 2) become a single vessel and points 7, 6, and 8c become points, 4, 5, and 8b, respectively. In embodiments in which the pressure oxidizer device is positioned within a recycle loop of an anaerobic digester, the recycle solids flow relative to the total digester contents is preferably about 0.1% to about 500% per day, more preferably about 0.5% to about 100% per day, and most preferably about 2% to about 25% per day.

Pressure oxidation may also precede or follow particle homogenization processes such as hydrodynamic cavitation, ultrasonification, or conventional high pressure, high shear nozzles that break up particulates/bioflocs and disrupt microbial cell membranes.

In some embodiments, residence time of digester material within the moderate pressure reactor is about 0.5 to about 60 minutes, preferably about 1 to about 30 minutes, and more preferably about 2 to about 15 minutes. In some embodiments, residence time of digester material within the pressure oxidizer device is about 0.5 to about 60 minutes, preferably about 1 to about 30 minutes, more preferably about 2 to about 15 minutes.

FIG. 1 illustrates an exemplary embodiment of a pressure oxidizer device according to the invention. The exemplified pressure oxidizer device 100 contains a moderate pressure pipe reactor 110 having a pressure safety valve 112, a pressure indicator 111, and a flow restriction/backpressure regulator 113. The pressure oxidizer device 100 also includes an oxygen sensor 180 and ORP sensor 195 positioned downstream of the moderate pressure pipe reactor 110 and low pressure pipe reactor 120. The low pressure pipe reactor 120 is connected to the moderate pressure pipe reactor 110 by reactor piping 190. The low pressure pipe reactor 120 includes an LEL/oxygen sensor 121, a pressure indicator 122, and a flow restriction/backpressure regulator 123. The pressure oxidizer device 100 includes a pump 140 which is connected to moderate pressure pipe reactor 110 by reactor piping 190, which includes a flow meter 160, a static mixer 185, a backflow preventer 150, and an oxidant injector 170. The pressure oxidizer device 100 is connected to an anaerobic digester (not shown) by reactor piping 190 from which digester material is received into the pressure oxidizer device 100. The pressure oxidizer device also comprises a central process controller 130 which receives data input from the flow meter 160, pressure indicators 111 and 122, LEL/$O_2$ sensor 121, ORP sensor 195, and $O_2$ sensor 180. The central process controller 130 controls pressure within the moderate pressure pipe reactor 110 by relating output data to a flow restriction/backpressure regulator 113 of the pressure oxidizer device 100. The central process controller 130 controls flow rate by relating output data to flow restriction/backpressure regulators 113 and 123 and to the pump 140. The central process controller 130 controls the amount of oxidant addition within the pressure oxidizer device 100 by relating output data to the oxidant injector 170. The central process controller 130 controls operating pressure within the moderate pressure pipe reactor 110 by relating output data to the flow restriction/backpressure regulator 113 positioned within the moderate pressure pipe reactor 110. The central process controller 130 also controls operating pressure within the low pressure pipe reactor 120 by relating output data to the flow restriction/backpressure regulator 123.

Wastewater Treatment System

Pressure oxidation. Another aspect described herein is a wastewater treatment system including as a component the pressure oxidizer device described above. In some embodiments, the wastewater treatment system includes one or more of a primary clarifier, a primary thickener (e.g., a gravity thickener), a Stage 1 anaerobic digester, a Stage 2 anaerobic digester, and/or a dewatering component such as a filter or centrifuge. In other embodiments, the Stage 1 and Stage 2 digesters may be combined into a single vessel. In treatment systems having a primary thickener, the pressure oxidizer device may be positioned upstream of the primary thickener. In treatment systems having a Stage 1 or combined anaerobic digester, the pressure oxidizer device may be positioned upstream of the Stage 1 or combined anaerobic digester. In treatment systems having a Stage 1 anaerobic digester and a Stage 2 anaerobic digester, the pressure oxidizer device may be positioned between the Stage 1 anaerobic digester and the Stage 2 anaerobic digester. In some preferred embodiments, a pressure oxidizer device is positioned within a recycle loop of a Stage 1 or combined anaerobic digester. In some preferred embodiments described herein, a pressure oxidizer device is positioned within a recycle loop of a Stage 2 anaerobic digester, or to a recycle loop between a Stage 2 and Stage 1 anaerobic digester, or to a recycle loop within a single combined anaerobic digester, or a recycle loop between multiple combined anaerobic digesters. The wastewater treatment systems contemplated herein may include more than one pressure oxidizer device. For example, a treatment system may contain a pressure oxidizer device positioned at any two, three, four, or more of the aforementioned locations.

In some embodiments, the wastewater treatment system includes an oxidant injector or pressure oxidation device positioned downstream of a dewatering component for adding oxidant to the supernatant of a Stage 1, Stage 2, or combined anaerobic digester.

FIG. 2 illustrates an exemplary embodiment of a wastewater treatment system according to the invention. A pressure oxidizer device (hydrogen peroxide is shown by way of example) may be applied at one or more of: influent to the primary thickener, digester material within a recycle loop within a Stage 1 digester, digester material within a recycle loop within a Stage 2 digester, digester material prior to dewatering, and supernatant following dewatering yet prior to return to other wastewater treatment plant processes (e.g., the headworks).

What is claimed:

1. A method of enhancing digestion of digester material of an anaerobic digester, said method comprising:
adding oxidant to the digester material, wherein said oxidant provides dissolved oxygen; and
pressurizing said digester material to elevate or sustain the dissolved oxygen concentration relative to the dissolved oxygen concentration achieved upon addition of said oxidant,
wherein said digester material comprises iron and wherein the pH and temperature of said digester material following pressurization are natural pH and temperature.

2. The method of claim 1 wherein said iron is added to said digester material.

3. The method of claim 1 wherein the digester material comprises about 5 to about 5000 milligrams of iron per liter of digester material.

4. The method of claim 2 wherein said iron that is added to the digester material comprises ferrous chloride, ferric chloride, ferrous sulfate, ferric sulfate, or combinations thereof.

5. The method of claim 2 wherein said iron is added at one or more of the collection system, the treatment plant headworks, the primary clarifier influent, the primary thickener influent, the digester influent, or a recycle line to/from the digester.

6. The method of claim 1 wherein the oxidant is oxygen, hydrogen peroxide, or combinations thereof.

7. The method of claim 1 wherein the dose of said oxidant is about 10 milligrams of oxidant per liter of digester material to about 10,000 milligrams of oxidant per liter digester material.

8. The method of claim 1 wherein said step of pressurizing comprises subjecting said digester material to pumping, mixing, ultrasound, hydrodynamic cavitation, endogenous decomposition of hydrogen peroxide, or combinations thereof.

9. The method of claim 1 wherein said step of pressurizing accelerates oxidation of sulfide and ferrous iron in said digester material to elemental sulfur and ferric iron.

10. The method of claim 1 wherein said digester material and oxidant are pressurized within a pressure oxidizer device.

11. The method of claim 1 wherein said pressurizing comprises applying a moderate pressure of about 50 psig to about 350 psig to said digester material.

12. The method according to claim 1 wherein said digester material comprises digester influent, digester effluent, settled solids from a digester, supernatant from a digester, or combinations thereof.

13. The method of claim 11 wherein said pressurizing further comprises applying a low pressure of about 5 to about 25 psig to said digester material.

14. The method of claim 13 wherein the dissolved oxygen concentration of said digester material following said step of applying low pressure is less than about 10 mg/L.

15. The method of claim 1 further comprising adding oxidant to solids of said digester material prior to entry of said digester material into the anaerobic digester.

16. The method of claim 1 wherein oxidant is added to the supernatant of said anaerobic digester effluent subsequent to dewatering but prior to being returned to said anaerobic digester to oxidize sulfide and ferrous iron to elemental sulfur and ferric iron.

* * * * *